United States Patent [19]
Vogt

[11] Patent Number: 4,853,685
[45] Date of Patent: Aug. 1, 1989

[54] SWITCH MONITORING ARRANGEMENT WITH REMOTE ADJUSTMENT CAPABILITY HAVING DEBOUNCE CIRCUITRY FOR ACCURATE STATE DETERMINATION

[75] Inventor: William R. Vogt, Rockaway, N.J.

[73] Assignee: Baker Industries, Inc., Parsippany, N.J.

[21] Appl. No.: 188,323

[22] Filed: Apr. 29, 1988

[51] Int. Cl.⁴ .................. H04Q 9/00; H03K 17/56
[52] U.S. Cl. .................. 340/825.170; 340/825.360; 340/825.370; 340/506; 340/512; 307/542.100
[58] Field of Search ............. 340/825.17, 825.54, 340/825.06, 870.18, 870.24, 870.2, 870.19, 365 E, 644, 511, 512, 825.08, 506, 514, 825.36, 825.37; 328/151; 367/117; 341/24, 25; 307/542.1

[56] References Cited

U.S. PATENT DOCUMENTS

| | | | |
|---|---|---|---|
| 3,866,128 | 2/1975 | Fletcher et al. | 307/542.1 |
| 3,886,543 | 5/1975 | Marin | 340/365 E |
| 4,028,560 | 6/1977 | Bainter | 340/365 E |
| 4,498,074 | 2/1985 | Sasaki | 340/512 |
| 4,658,249 | 4/1987 | Vogt | 340/825.08 |
| 4,749,986 | 6/1988 | Otani et al. | 340/511 |

FOREIGN PATENT DOCUMENTS

| | | | |
|---|---|---|---|
| 52-51976 | 4/1977 | Japan | 307/542.1 |
| 52-51977 | 4/1977 | Japan | 307/542.1 |

*Primary Examiner*—Donald J. Yusko
*Assistant Examiner*—E. O. Pudpud
*Attorney, Agent, or Firm*—James J. Jennings

[57] ABSTRACT

An independent transmitter/receiver, or a transponder in a communication system, receives signals distorted by outside, unwanted conditions such as noise, line capacitance, and so forth. The status of a switch is checked at periodic times, by pulsing, rather than by continuous current flow, to conserve power. The invention includes a debounce circuit for monitoring the switch status; the debounce circuit is adjusted by a debounce select signal received from outside the transmitter/receiver. In addition a sensing circuit is coupled between the switch being monitored and the debounce circuit. The sensing circuit also has its sensing operation adjusted as a function of the debounce select signal. This allows for accurate monitoring of the switch condition, notwithstanding noise, line capacitance and other factors.

9 Claims, 6 Drawing Sheets

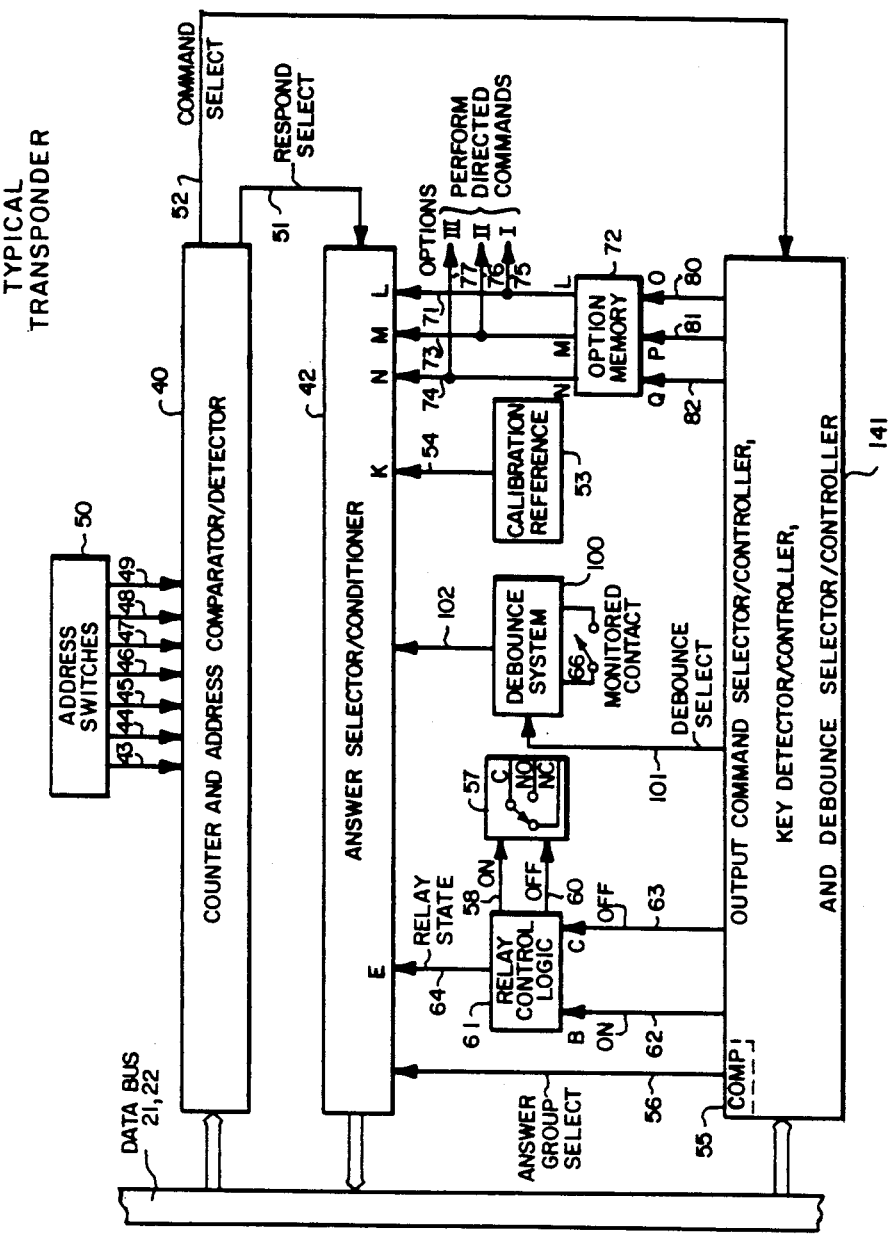

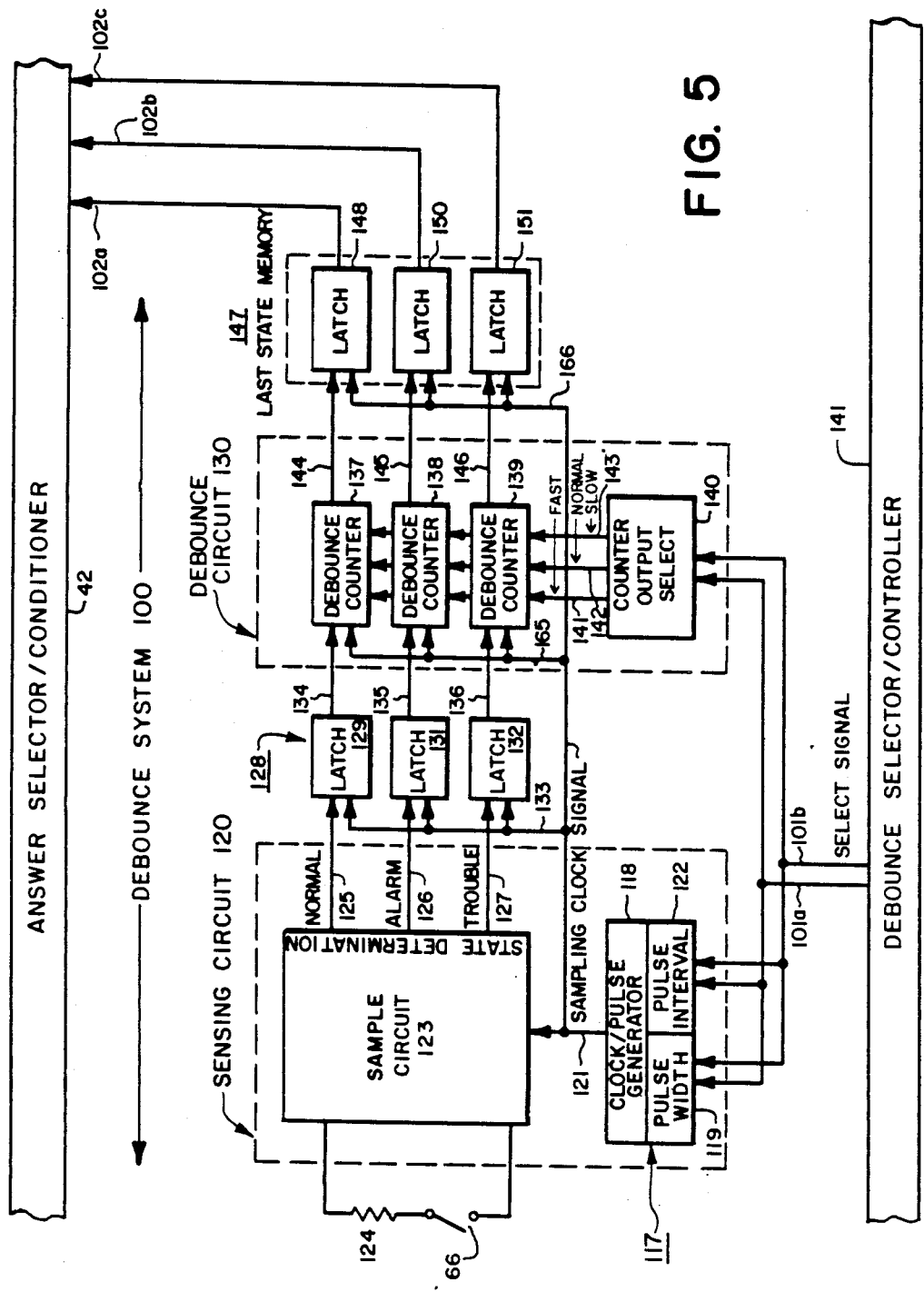

SIGNAL BEING SAMPLED

CLOCK SAMPLE RATE (2 REQUIRED)

(4 REQUIRED)

(8 REQUIRED)

FIGS. 7C, 7D AND 7E SHOW NUMBER OF CONSECUTIVE SAMPLES REQUIRED BY DEBOUNCE CIRCUIT

SWITCH MONITORING ARRANGEMENT WITH REMOTE ADJUSTMENT CAPABILITY HAVING DEBOUNCE CIRCUITRY FOR ACCURATE STATE DETERMINATION

The present invention is directed to a monitoring arrangement, that is, an arrangement for sensing some parameter of a signal at given intervals, then processing the result of the sensing, and as a result of that processing, providing an indication of the parameter. In addition a signal received from outside the monitoring arrangement adjusts the sensing operation and/or the processing operation in the system operation.

The invention is useful in connection with monitoring the state of a mechanical switch or analogous units in fire and/or burglar alarm systems. For simplicity of explanation a simple, two position switch will be shown and described. In general the invention is concerned with indicating the switch state (such as open or closed) to an associated circuit.

BACKGROUND OF THE INVENTION

Various types of circuits have been employed to determine and indicate switch status. Frequently a "debounce" circuit is used, and such an arrangement inspects the switch condition from time to time and then reports on its status. Often the inspection is made by passing a current through the switch. Using a continuous current flow, the probability of error in the state determination is minimal, bu this consumes considerable power. Energy is conserved by shortening the time during which the current is passed through the switch, but this may also increase error in the state determination process, as will be more fully explained hereinafter. It is thus important to attain the optimum trade-off between duration of current flow (that is, power consumption) and proper determination of the switch state.

The inventive system operation is roughly comparable to peeking at a scene or situation, and surmising from a series of peeks what is going on. Suppose someone is watching television, and the family cat is in the corner of the same room. The television watcher occasionally glances at the cat to determine if the cat is sleeping, eating, or playing. The watcher can vary the frequency and/or duration of the glance, and comes to an initial determination of what the cat is doing based on the results noted during the glances. After the first conclusion is made, a further refinement can be added, such as requiring a finite number of successive indications of the same state to conclude what the cat is actually doing. This two step procedure, an initial sensing and a subsequent confirmation, is helpful in gaining a perspective on the invention described below.

Many different types of circuits have been used to examine the state of a given contact set, and report or otherwise signal to associated equipment what is the status of the particular contact. One such example is found in U.S. Pat. No. 4,658,249, entitled "Data Communication System With Key Data Bit Denoting Significance of Other Data Bits", which issued Apr. 14, 1987 to William R. Vogt, the inventor of the subject matter described in this application. This earlier patent depicts in FIG. 7 a "monitored contact" 66, the state of which is examined and reported by a switch state determination arrangement 67. It is to the improvement of such arrangement that the present invention is principally directed. Hence U.S. Pat. No. 4,658,249, and the other patents described in column 1 of that patent, are incorporated herein by reference. In general it is desired to improve upon the arrangement of the '249 patent by providing an improved debounce circuit which not only provides the option of modifying operation of the determination circuit, but in addition effects such modification in accordance with a signal received from an external source.

SUMMARY OF THE INVENTION

The present invention may include a transmitter/receiver which is operable to receive first signals and to transmit second signals. Switch means is provided, either internal or external to the transmitter/receiver; the switch means has at least two states. The transmitter/receiver includes a debounce circuit, which is operable to utilize a preset time period in determining the state of the switch means. In addition the transmitter/receiver includes some means, operable in response to a received first signal, to provide a select signal to the debounce circuit, for establishing the preset time period.

In accordance with another feature of the invention, the transmitter/receiver may include a sensing circuit, coupled between the switch means and the debounce circuit, for indicating to the debounce circuit the state of the switch means. The select signal is also used to modify operation of the sensing circuit.

Stated in another way, the present invention may be incorporated in a communication system which utilizes a transmitter or controller for sending the first signals to a plurality of receivers or transponders which both receive the first signals and return second signals to the transmitter. A switch means is provided, either within or without at least one of the receivers, and this switch means has at least two states. The receiver associated with the switch means includes state determination means, coupled to that switch means, for providing a status signal which varies as a function of the state of the switch means. Also included in the receiver is a debounce circuit, operable to receive the status signal from the state determination means, and to operate upon this status signal to provide a resultant signal. Further the receiver includes selector/controller means, which operates in response to a first signal received from the transmitter to provide a select signal to the sensing circuit and to the debounce circuit. This select signal modifies both the sensing circuit and the debounce circuit in the specific receiver in accordance with the information received in the first signal from the transmitter.

THE DRAWINGS

In the several figures of the drawings, like reference numerals identify like components, and in those drawings:

FIG. 2 is a block diagram, similar to FIG. 7 in the earlier '249 patent, but modified to incorporate in a general way the debounce system of the present invention;

FIG. 5 is a block diagram of the debounce arrangement of the present invention;

GENERAL SYSTEM DESCRIPTION

Figure 1:
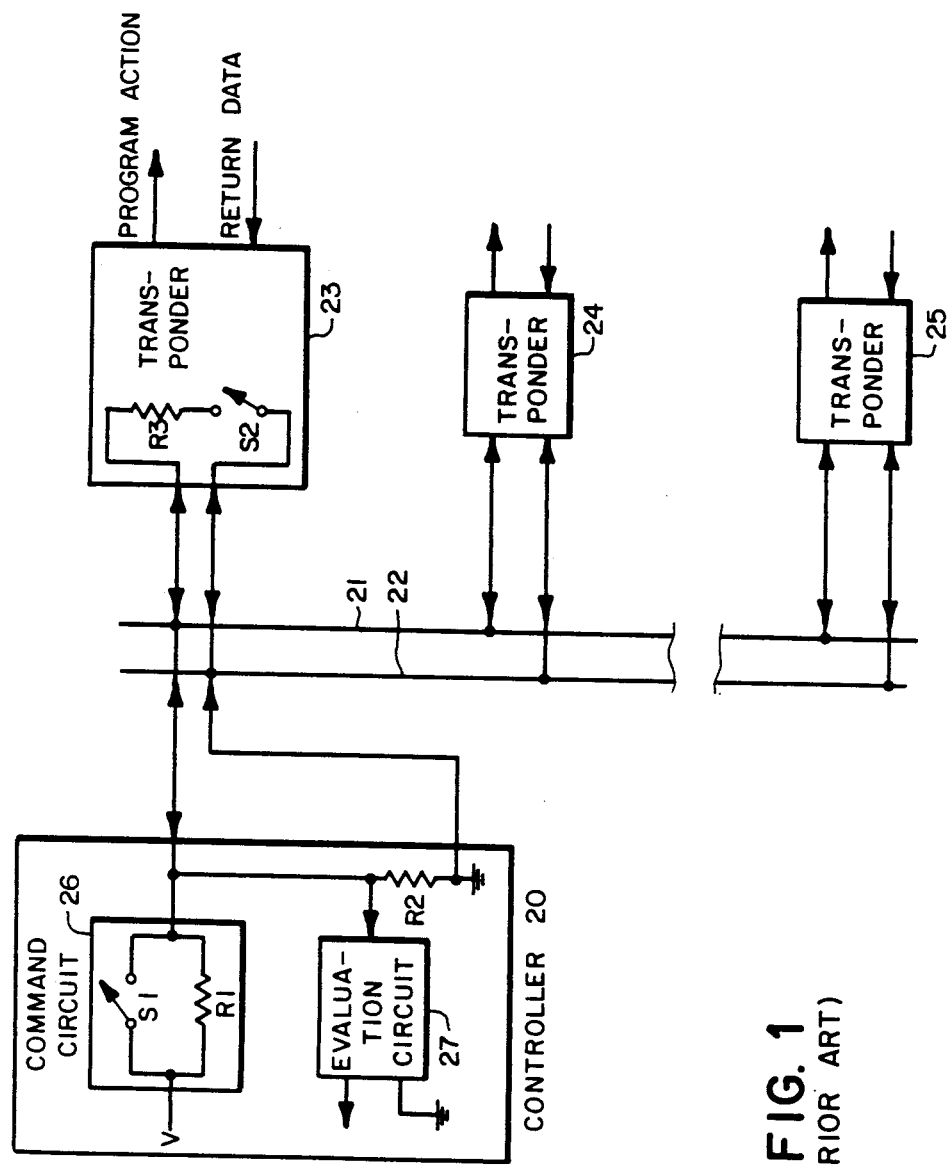
FIG. 1 is a block diagram depicting components of a known communication system.

FIG. 1 of this application depicts a communication system, and is the same illustration as FIG. 1 in the above-identified '249 patent. Controller 20 includes a command circuit for sending signals over the data bus 21,22 to a plurality of transponders or transmitter/receivers 23,24 and 25. In response to these first or incoming signals, the various transponders can initiate or return second or outgoing signals over the data bus to the controller. Other types of communication systems are also pertinent to the invention, as well as stand-alone transmitter/receivers which provide an effective, variable debounce as a function of a received debounce-adjust select signal.

FIG. 2 of the present application is very similar to FIG. 7 of the above-identified '249 patent. However, the switch state determination circuit 67 in that patent has been replaced in FIG. 2 of this application by debounce system 100, shown receiving a debounce select signal over conductor 101 and providing an output or control signal over line 102 to the answer selector/conditioner circuit 42. The related circuit 41, in the earlier teaching an "output command selector/controller and key detector/controller" 41 has been replaced in the present application by stage 141, denoted an "output command selector/controller, key detector/controller, and debounce selector/controller". In other words, the function of debounce selector/controller has been added to the related circuitry in the earlier teaching, and for this reason is given the reference numeral 141. Reference numerals under 100 in FIGS. 1 and 2 correspond exactly to the reference numerals and components identified thereby in the '249 patent, to facilitate familiarization with the general area in which the invention is used. A monitored contact set 66 is provided and coupled to debounce system 100, so that this system can make a determination as to the status of the contact and provide an output signal over line 102, ultimately for return to the controller or transmitter, denoting the status of the monitored contact.

Figure 3A:
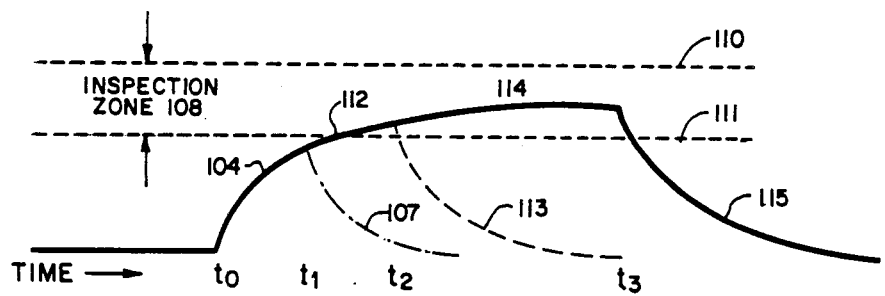
FIGS. 3A–3D and 4A–4C are graphical illustrations useful in understanding the invention.
Figure 3B:
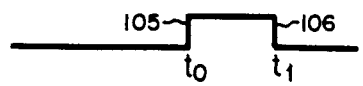

FIGS. 3A through 3D are useful to understand one of the problems associated with the trade-off between reducing the current flow (to conserve power) in determining the switch status, and the proper determination of that status. FIG. 3A shows a representation of an actual pulse, modified by actual conditions such as line capacitance. In the time up to t0, the solid line curve is level indicating no pulse has been generated. At time t0 in FIG. 3B, a pulse having a steep wave front 105 is generated. This results (FIG. 3A) in an actual signal having a solid portion 104 showing the voltage rise as the lines are charged. If the pulse shown in FIG. 3B is terminated at t1, instead of a rapid descent as depicted by segment 106, the actual decay follows the path indicated by the dash-dot line 107 in FIG. 3A. An arbitrary inspection zone denominated 108 is established between the dotted lines 110 and 111. Even if the monitored switch contacts were closed when the test pulse shown in FIG. 3B was generated, the actual signal (104,107) would not rise to the lower limit of the inspection zone, thus giving an erroneous response.

Figure 3C:
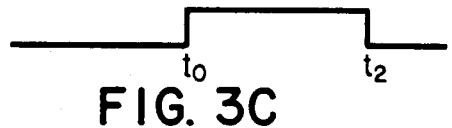

FIG. 3C shows a pulse of the same amplitude but longer time duration, from t0 to t2. This means that the pulse of the same amplitude would continue past segment 104 and include segment 112 in FIG. 3A, and at time t2 this segment would begin to decline toward zero as shown by the broken line 113. It is noted that the segment 112 extends into the inspection zone, but not for a very significant portion of that zone. This means that a determination can be made that the pulse segment 112 entered the zone, indicating switch status, but there is not a significant margin for error because of the limited extension of the pulse segment into that zone.

Figure 3D:

If the pulse duration is made for a longer time interval, such as from t0 to t3 as shown in FIG. 3D, then the lines can charge up even more so that the pulse charge continues through the segment 114 before it begins to decline over the segment 115. This means that the determination can be made that the pulse was of a sufficient duration to make a determination that it entered the inspection zone, with a greater margin for error than is the case for the pulse duration shown in FIG. 3C. However the trade-off is that more power is expended with the signal shown in FIG. 3D.

Figure 4A:
Figure 4B:
Figure 4C:
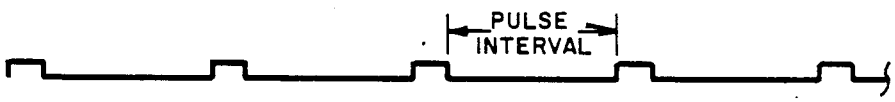

FIGS. 4A, 4B and 4C depict different ways in which the pulse width and the pulse interval can be varied, to help compensate for factors such as line capacitance, noise on the line, and so forth. In FIG. 4A two brief duration, closely spaced pulses are shown followed by a pulse interval extending for a somewhat longer interval than that of the two pulses themselves. In FIG. 4B the same pulse interval is maintained as contrasted to FIG. 4A, but the pulse width is approximately tripled. From the explanation given in connection with FIGS. 3A-3D, it is evident that the extended on time in FIG. 4B allows more time to let the pulse rise into the inspection zone. FIG. 4C shows a different pulse train with an extended pulse interval as contrasted to the showing in FIG. 4B.

Those skilled in the art will understand there is no such thing as a "pulse" or "pulse train", in the abstract. Rather waveforms such as those shown in FIGS. 4A-4C represent variations in voltage, current, or some other parameter of a signal which can be produced and later measured. It is in that sense that the term "pulse" and/or "pulse train" is used herein and in the appended claims.

DETAILED DESCRIPTION OF THE INVENTION

FIG. 5 depicts the various components of debounce system 100. Major components are a sensing circuit 120 and a debounce circuit 130, coupled in series between a switch 66 and the output conductors which pass the debounced signal to the answer selector/conditioner 42, for cooperating in regulating the transmission of a signal to a controller or to some other unit. In a general way sensing circuit 120 performs the "peeking" function described generally above, to estimate the status of something, and debounce circuit 130 provides the "confirmation" of the initial status estimate produced by the sensing circuit.

In more detail, conductors 101a and 101b, which receive the debounce select signal from selector/controller 141, are connected to a timing pulse generator circuit 117, which includes a clock pulse generator circuit 118, a circuit 119 for adjusting the pulse width provided on output line 121 as a function of the debounce select signal, and another circuit 122 for adjusting the interval between pulses of the train of pulses provided on output line 121, also as a function of the debounce select signal. Such circuits are well known and understood in the art, and are easily implemented with off-the-shelf components. The output signal on line 121, termed the sampling clock signal, is applied to sample circuit 123 to regulate the times at which the samples of (or "peeks" at) the status of switch 66 are provided. An end-of-line resistor 124 is coupled in series with switch contact set 66, to reduce the current flow through this circuit when the switch is closed and the sample circuit 123 is evaluating the position of the switch by sending a current through the switch.

Sample circuit 123 provides a normal output signal on line 125, or an alarm output signal on line 126, or a trouble output signal on line 127, depending on the status of switch 66 and its associated components. For example if the current flow assessed through the switch circuit falls in an expected range, a normal signal could be provided. If the current flow is excessive, it could indicate an alarm condition. A signal measured below the expected normal state would indicate some type of trouble. Provision of the sample circuit and the various outputs indicating the state determination of switch 66 are well known in this art, and it is sufficient to indicate that the identified state signal is passed to one of the individual latches within a latch circuit 128.

This latch circuit includes individual latches 129, 131 and 132. Each latch is a simple circuit such as a flip-flop which is changed in state when it receives an appropriate signal on one of the input lines (125, 126 or 127) at the same time that a sampling clock signal is passed over lines 121 and 133 to the three latch circuits. Accordingly only one of the latches 129, 131 and 132 is indicating a positive or identified signal output on its appropriate output conductor 134, 135 or 136 at any one time. These signals are in turn passed to the respective debounce counters 137, 138 and 139 in debounce circuit 130. It is noted that the debounce select signal, on lines 101a and 101b, is passed not only to the timing pulse generator circuit 117 utilized in the sensing circuit 120, but also to the counter output select circuit 140 which is a portion of debounce circuit 130. Counter output select circuit 140 utilizes the debounce select signal to provide a preset time period by indicating an appropriate signal on the respective one of its output conductors 141, 142 or 143. These signals are termed fast, normal and slow in the present arrangement. The fast signal on line 141 is passed to each of the debounce counters 139, 138, and 137, and likewise the normal and slow control signals, when provided by circuit 140, are also applied to each of the debounce counters 137-139. This insures that the appropriate one of the debounce counters—depending on which one has an identified signal appearing on its respective input conductor at the time—will be controlled in the preset time period determined by counter output select circuit 140 to provide on one of the output conductors 144, 145 or 146 the appropriate debounced signal to one of the latches in the last state memory circuit 147. These latches are latch 148 in the normal line, latch 150 in the alarm line, and 151 in the trouble line. Depending on which of these latches is indicating an output signal, that signal is then applied over the respective one of output conductors 102a, 102b or 102c to answer selector/conditioner circuit 42 to assist in generating the appropriate return signal from the transponder to another unit in the communication arrangement.

In operation, if the debounce system 100 is in a stand alone environment, it is controlled by an incoming signal, which in the illustrated embodiment is decoded in debounce selector/controller 141. In a communication system this signal is received from a transmitter, over the air, over a data bus, or through some other communication path. The decoded output of stage 141 provides the debounce select signal on lines 101a and 101b for regulating both the sensing operation in circuit 120 and the confirmation process in debounce circuit 130. Those skilled in the art will appreciate that, if the option memory 72 (FIG. 2) and its associated circuitry were not used in a given embodiment, then the debounce select signal could be derived from conductors 80,81.

The debounce select signal applied to the timing signal generating circuit 117 (FIG. 5) is effective to establish the sampling clock signal on line 121. This signal is similar to those shown in FIGS. 4A-4C, and the pulse width can be modified by circuit portion 119 and the pulse interval modulated by pulse interval circuit 122. This provides the variations illustrated in FIGS. 4A-4C. The sampling event occurs at the termination of a pulse, as the signal goes low. Inspection of FIGS. 4A-4C indicates how the "peeks" can thus be varied in accordance with the debounce select signal.

The state determination signal appears either as a normal status signal on line 125, or an alarm signal on conductor 126, or a trouble status signal on line 127. It is evident that the status signal provided on conductors 125-127 varies as a function of the state of switch 66. In addition the signal varies as a function of the debounce select signal because the sampling clock signal is modified and thus the state determination is made differently with changes in the debounce select signal.

Once the initial state determination is made, the status signal is presented, through the latch circuit 128, to the inputs of the counters 137-139 in debounce circuit 130. The counters also receive the sampling clock signal over line 165. As will become evident in considering FIG. 6 hereafter, instead of individual counters the debounce circuit can include shift register circuits to provide the different preset time periods for fast, normal or slow operation. This results in an output signal on one of the conductors 144-146, which is passed through the last state memory circuit 147 to control the output from the receiver or transponder as previously described. With this perspective, the debounce circuit of FIG. 6 will now be described.

Figure 6:
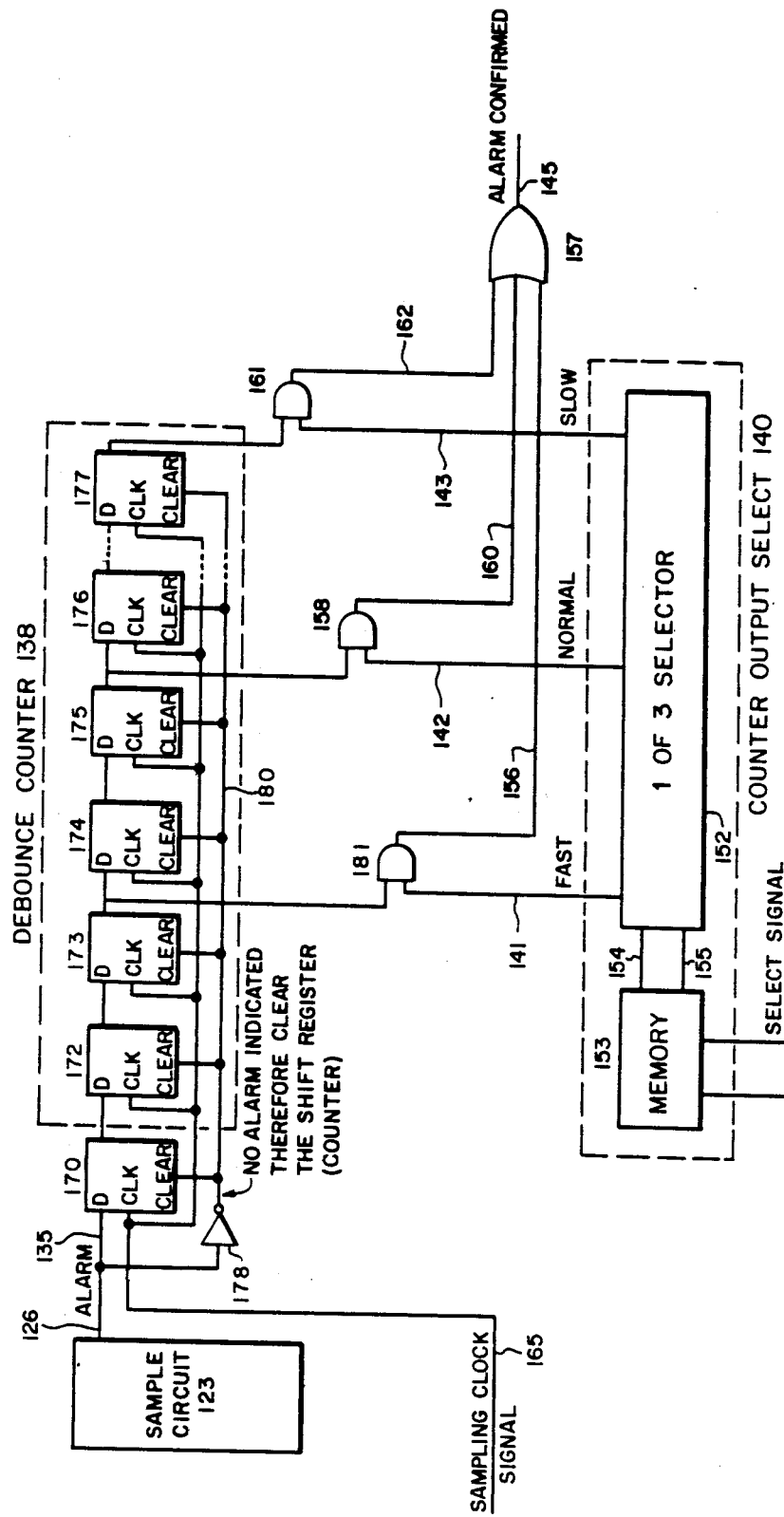
FIG. 6 is a block diagram, partly in schematic form, of one portion of the debounce circuit shown in FIG. 5.

FIG. 6 shows a debounce counter 138, one of the three circuits depicted in debounce circuit 130. A conventional shift register circuit forms counter 138, and an additional flip-flop stage 170 is connected to receive the alarm-indicating signal over conductor 135 and the sampling clock signal over line 165. When latch 131 (FIG. 5) provides a positive indication of an alarm, at the same time the sampling clock signal on line 121 and line 165 (FIG. 6) goes low, a count is registered in stage 170. Each subsequent count is thus clocked through the register including stages 172-177. Two additional stages (not shown) are connected between stage 176 and stage 177. Whenever there is no alarm indicated on line 135, inverter stage 178 provides on line 180 a register-clearing signal, and counter 138 is reset to zero.

A first AND stage 181 receives the output of register stage 173 and a "fast" signal over line 141 from the counter output select stage 140, which includes a one-of-three selector 152. A memory stage 153 is connected in stage 140 to receive the debounce select signal over conductors 101a, 101b, and provide over conductors 154 and 155 a signal indicating the selected speed to the one-of-three selector 152. If the "fast" state is selected, then the output of register 173 is clocked from AND circuit 181 (when the signal is present on line 141), over line 156 and through OR gate 157 and conductor 145 to signal that an alarm condition has been confirmed in the fast operation mode.

If the "normal" mode has been selected then AND gate 158 receives the output state of register state 145 and, coincident with the signal on line 142, provides an output over line 160 to another input of OR stage 157. In the "slow" mode, the entire register must be filled so that the output of stage 177 is passed through AND gate 161, when a signal is present on line 143, and over line 162 to OR gate 157. It is thus evident that the debounce circuit utilizes a preset time period, fast, normal or slow in the described embodiment, to provide an output signal connoting the state of switch 66. This preset time period is established by the debounce select signal received over lines 101a and 101b, which determines the fast, normal and slow modes, in turn setting how many consecutive alarm signal confirmations must be received over line 135 before an "alarm-confirmed" output signal is passed over line 145.

Figure 7A:
FIGS. 7A-7E are graphical illustrations useful in understanding operation of the invention.
Figure 7B:
Figure 7C:
Figure 7D:
Figure 7E:

The operation of the debounce counters 137, 138 and 139 can be visualized in connection with FIGS. 7A–7E. In FIG. 7A a confirmed alarm signal is shown, of the type that might be presented at the output side of latch 131 and passed to debounce counter 138. This is the signal being sampled. FIG. 7B depicts the clock sample rate, that is, a series of pulses occurring at a frequency determined by the debounce select signal on conductors 101a and 101b, ultimately used to provide the sampling clock signal on conductor 121. The debounce select signal is also used, through counter output select circuit 140, to determine how many consecutive samples must be obtained to provide an indication of the actual state. FIG. 7C shows the output derived when two consecutive clock samples are required to indicate the state of the signal in FIG. 7A. This is analogous to fast operation of the debounce counter, with the signal being clocked out of AND circuit 181. FIG. 7D depicts the signal produced when four consecutive samples are required, and is analogous to normal operation of the debounce system. FIG. 7E depicts the output when eight consecutive like samples are required, similar to slow operation in which the output is clocked through AND circuit 161 to provide the output signal. Thus it is evident that a considerably different output waveform can be derived from a given signal being sampled, depending upon whether fast, normal or slow operation is dictated by the debounce select signal and the other portions of the system of this invention.

TECHNICAL ADVANTAGES

The present invention provides a system with positive determination of a switch state, made from a unit which receives a remote signal indicating the manner in which the switch status will be determined. In a preferred embodiment the switch status is first sensed or "peeked at", forming the initial switch determination output signal. In turn this initial determination is monitored by an adjustable rate confirmation circuit, to determine the status of the switch being monitored. Both the sensing and the debounce functions are regulated from a signal received remotely, either from a controller in a communication system or from some other source through a given communication path. If desired the sampling signals such as those shown in FIGS. 4A–4C can be alternated in polarity, so that by passing the d-c current through the switch and associated components in opposite directions, a more precise evaluation of the system can be provided. The polarity alternation function can be included in pulse generating means 117.

It is important to note that the present system is particularly useful with life and property protection systems, such as fire alarm systems and burglar alarm systems. The invention provides the advantages of d-c monitoring of a pulse state, but without the power loss consequent upon use of continuous d-c current flow. The various controllable operating parameters also accommodate different system configurations and conditions. In the theoretical world the pulses can be considered as perfectly rectangular, that is, having straight leading edges and perfectly perpendicular trailing edges, but in practice, every line has some measurable capacitance and noise intrudes upon every system. The noise tends to come in bursts or in a concentrated series. By allowing both the sensing circuit and the debounce circuit to be varied as to the initial sensing and subsequent confirmation functions, a more reliable determination can be made and the system can be accommodated to various noise, capacitance and other system fluctuations.

In the appended claims the term "connected" means a d-c connection between two components with virtually zero d-c resistance between those components. The term "coupled" indicates there is a functional relationship between two components, with the possible interposition of air or other elements between the two components described as "coupled" or "intercoupled".

While only a particular embodiment of the invention has been described and claimed herein, it is apparent that various modifications and alterations of the invention may be made. It is therefore the intention in the appended claims to cover all such modifications and alterations as may fall within the true spirit and scope of the invention.

What is claimed is:

1. A transmitter/receiver operable to receive first signals and transmit second signals, and switch means having at least two states, in which the transmitter/receiver includes:

a debounce circuit, coupled to said switch means, and operable to utilize a preset time period in determining the state of the switch means; and means, operable in response to a received first signal, to provide to the debounce circuit a select signal for establishing said preset time period.

2. A transmitter/receiver as claimed in claim 1, further comprising a sensing circuit, coupled between the switch means and the debounce circuit, for indicating to the debounce circuit the state of the switch means, and in which said select signal is also provided to the sensing circuit so that indication of the switch state varies as a function of the select signal.

3. A transmitter/receiver as claimed in claim 2, in which the sensing circuit includes timing pulse generating circuit, which receives the select signal and provides a sampling signal having the interval between sampling pulses regulated in accordance with the select signal.

4. A transmitter/receiver operable to receive first signals and transmit second signals, and switch means having at least two states, in which the transmitter/receiver includes:

a debounce circuit, coupled to said switch means and operable to utilize a preset time period in determining the state of the switch means;

means, operable in response to a received first signal, to provide to the debounce circuit a select signal for establishing said preset time period;

a sensing circuit, coupled between the switch means and the debounce circuit, for indicating to the debounce circuit the state of the switch means, and in which said select signal is also provided to the sensing circuit so that indication of the switch state varies as a function of the select signal, and in which the sensing circuit includes a timing pulse generating circuit, which receives the select signal and provides a sampling signal having a width of the sampling pulses regulated in accordance with the select signal.

5. A transmitter/receiver operable to receive incoming signals and transmit outgoing signals, and switch means having at least two states, in which the transmitter/receiver includes:

a sensing circuit coupled to the switch means for providing a status signal which varies as a function of the switch state;

a debounce circuit, coupled to the sensing circuit, operable to utilize a preset time period in providing an output signal connoting the state of the switch means; and selector/controller means, operable in response to a received incoming signal, to provide to the sensing circuit a select signal for modifying operation of the sensing circuit, and to provide said select signal to the debounce circuit to establish the preset time period.

6. A communication system comprising a data bus, a transmitter for sending first signals over the data bus, a plurality of receivers operable to receive the first signals over the data bus and to return second signals over the data bus to the transmitter, and switch means having at least two states, in which at least one of the receivers includes:

state determination means, coupled to said switch means, for providing a plurality of output signals which vary as a function of the switch means state;

a debounce circuit, operable to receive the output signals, to operate upon the output signals and to provide a resultant signal for contributing to the transmission of one of the second signals from the one receiver over the data bus to the transmitter; and selector/controller means, operable in response to a first signal received from the transmitter to provide a debounce select signal to the debounce circuit and to the state determination means, thus modifying the state determination means and the debounce circuit in the one receiver in accordance with information received in the first signal.

7. A communication system as claimed in claim 6, in which the state determination means includes a timing pulse generating circuit which receives the select signal and provides a sampling signal having the interval between sampling pulses regulated in accordance with the select signal.

8. A communication system comprising a data bus, a transmitter for sending first signals over the data bus, a plurality of receivers operable to receive the first signals over the data bus and to return second signals over the data bus to the transmitter, and switch means having at least two states, in which at least one of the receivers includes:

state determination means, coupled to said switch means, for providing a plurality of output signals which vary as a function of the switch means state;

a debounce circuit, operable to receive the output signals, to operate upon the output signals and to provide a resultant signal for contributing to the transmission of one of the second signals from the one receiver over the data bus to the transmitter; and selector/controller means, operable in response to a first signal received from the transmitter to provide a debounce select signal to the debounce circuit and to the state determination means, thus modifying the state determination means and the debounce circuit in the one receiver in a accordance with information received in the first signal, in which the state determination means includes a timing pulse generating circuit, which receives the debounce select signal and provides a sampling signal having the width of the sampling pulses regulated in accordance with the debounce select signal.

9. A communication system as claimed in claim 6, in which the one receiver further includes a selector/conditioner circuit, coupled to the data bus, for passing the second signals to the data bus, and a latch circuit, coupled between the output side of the debounce circuit and the selector/conditioner circuit, for retaining an indication of the resultant signal last issued from the debounce circuit.

* * * * *